Sept. 5, 1939.  A. I. LEVENTHAL  2,172,167
AUTOMATIC HAND SIGNAL LIGHT FOR VEHICLES
Filed Aug. 2, 1937   2 Sheets-Sheet 1
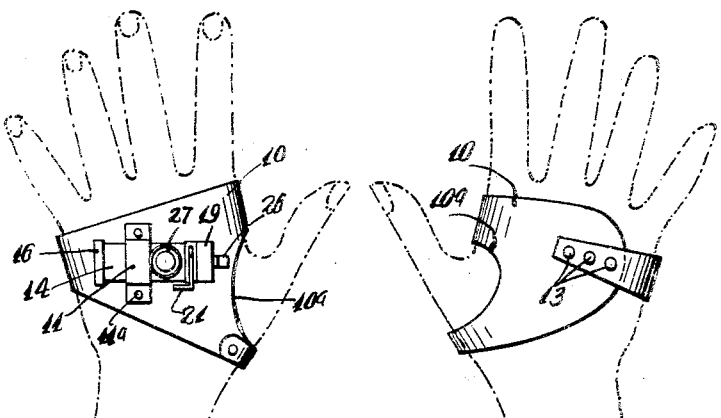
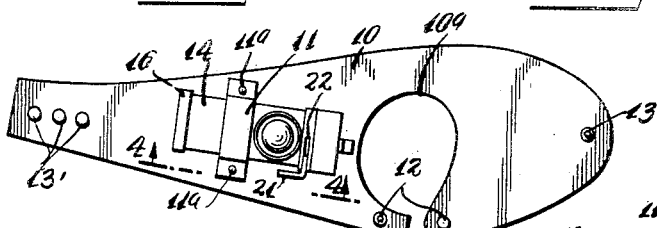
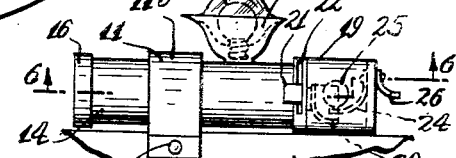
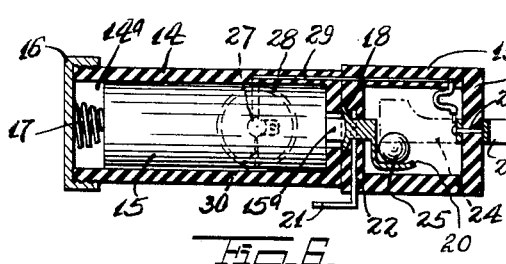
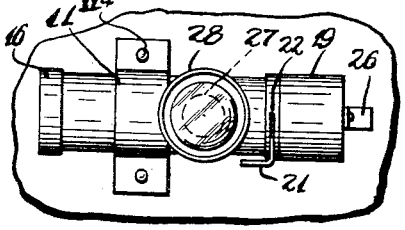
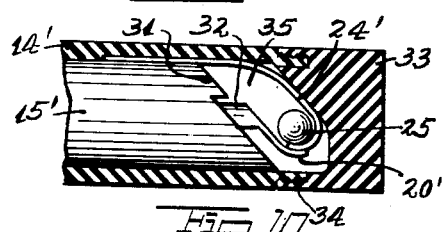
INVENTOR
*Abraham I. Leventhal*
BY
*Zoltan F. Polachek*
ATTORNEY Sept. 5, 1939.  A. I. LEVENTHAL  2,172,167

AUTOMATIC HAND SIGNAL LIGHT FOR VEHICLES

Filed Aug. 2, 1937    2 Sheets-Sheet 2

INVENTOR
*Abraham I. Leventhal*
BY
ATTORNEY

Patented Sept. 5, 1939

2,172,167

UNITED STATES PATENT OFFICE 2,172,167

AUTOMATIC HAND SIGNAL LIGHT FOR VEHICLES

Abraham I. Leventhal, New York, N. Y.

Application August 2, 1937, Serial No. 156,841

3 Claims. (Cl. 200—52)

This invention relates to new and useful improvements in an automatic hand signal light for vehicles.

The invention has for an object the construction of a signaling device which is adapted to be secured on one's hand and which is characterized by a peculiar construction which will cause the signaling device to automatically operate when the vehicle driver extends his hand from the window of the vehicle to signal a stop or a turn.

More specifically, the invention proposes to provide a strap for attachment on one's hand and a casing secured on said strap and adapted to hold a battery cell, a signal lamp, and the signal controlling mechanism.

Still further the invention proposes to characterize the signal controlling mechanism by a pair of contact leaves and a free ball adapted in certain positions of the device to close a circuit through the contact leaves and so control the signal.

Still further the invention proposes to provide an arrangement whereby each leaf may be individually adjusted for adjusting the device to act in slightly different positions to best suit the natural tendencies of a person holding his hand in certain positions when signaling and driving the vehicle.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view of a device constructed according to this invention and shown applied upon the back of one's hand.

Fig. 2 is an elevational view showing the ball side of the device.

Fig. 3 is a developed view of the strap by which a device is attached on one's hand.

Fig. 4 is a fragmentary elevational view looking in the direction of the line 4—4 of Fig. 3.

Fig. 5 is a plan view of Fig. 4.

Fig. 6 is an enlarged sectional view taken on the line 6—6 of Fig. 4.

Fig. 10 is a fragmentary sectional view similar to Fig. 6, but showing a modification of the invention.

Figure 7:
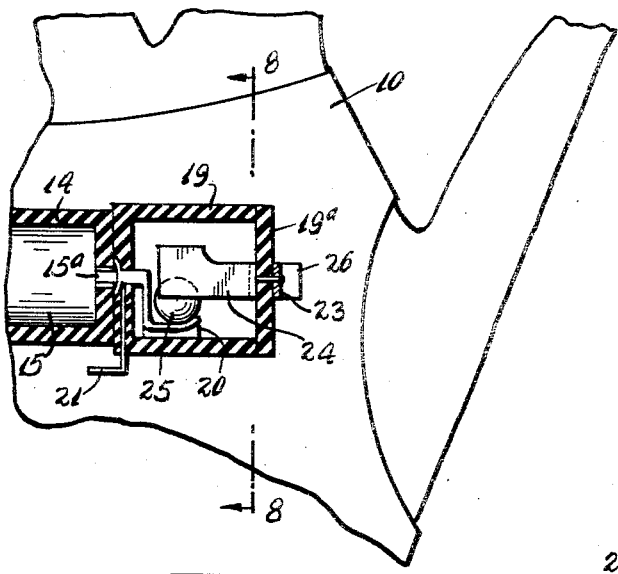
Fig. 7 is an enlarged view similar to a portion of the casing broken away to reveal underneath parts.
Figure 8:
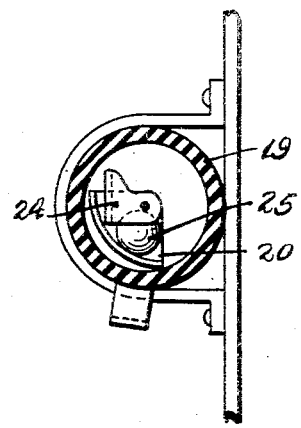
Fig. 8 is a sectional view taken on the line 8—8 of Fig. 7.
Figure 9:
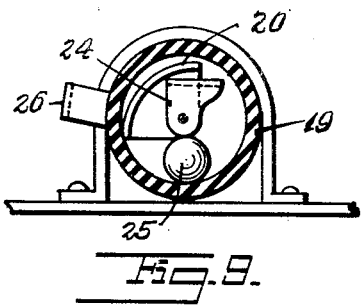
Fig. 9 is a view similar to Fig. 8, but showing the position of the parts when the circuit is open.

The automatic hand signaling light for vehicles, according to this invention, comprises a strap 10 for attachment on one's hand and provided with a strap 11 on the back portion thereof for supporting a signal device and actuating means. The strap 11 is secured at its ends by rivets or other fastening elements 11$^a$, and intermediate of its ends forms a loop 11$^b$ through which the signaling device is mounted. The strap 10 is of a shape so as to comfortably fit upon one's hand. It is formed with a large opening 10$^a$ intermediate of its ends adapted to encircle one's thumb. This opening 10$^a$ communicates with the edge portion of the strap by reason of a branch opening 10$^b$. The adjacent parts of this branch opening are provided with complementary fastening elements 12 which may be closed to secure the strap about one's thumb. The strap is adapted to extend around the back of one's hand to the palm and is secured closed across the palm by reason of a fastening element 13 upon one end of the strap engageable with one of a plurality of fastening elements 13' on the other end of the strap. The elements 13' provide for a selection of size for the strap to fit hands of different sizes.

The signaling device and operating means comprises a tubular casing 14 of insulating material and of a size adapted to fit beneath the loop portion of the strap 11 and frictionally maintain its position. This tubular casing 14 has an open rear end 14$^a$ through which a battery cell 15 may be engaged therein. The open rear end of the casing is normally closed by a cap 16 which threadedly engages thereon. A metallic spring 17 is mounted on the inside of the cap and engages against the bottom end of the battery cell 15 for urging the battery cell into a forward position. In this forward position the end contact 15$^a$ of the battery cell engages an end contact 18 upon a hollow cylindrical insulation body 19 which is mounted on the end of the casing 14 axially therewith.

The end contact 18 extends through the end wall of the body 19 and is rotative therein. A contact leaf 20 is mounted on the inner end of the end contact 18. A handle 21 for turning the end contact 18 is secured to the end contact and extends through the passage in the end wall of the body 19 to the exterior. This passage is in the form of a slot 22. The outer end of the handle 21 is adapted to be gripped and moved for the purpose of adjusting the end contact 18 to change the position of the contact leaf 20. The parts maintain all adjusted positions frictionally.

A spindle 23 is mounted through the outer end of the body 19. A contact leaf 24 is mounted on the inner end of the spindle 23. A ball connecter 25 is free within the body 19 and in certain positions of the device is adapted to simultaneously engage the leaf contact 20 and 24 and so electrically connect these parts. A handle 26 is mounted on the outer end of the spindle 23 by which the spindle may be manually turned for the purpose of changing the position of the contact leaf 24. An end wall 19ª of the body 19 is fused to the main portion of the body 19 after the contact leaves 20 and 24 and the ball 25 have been positioned therein.

A lamp 27 is mounted on the outer side of the casing 14. This lamp is surrounded by a protecting transparent cover 28' and a reflector 28. The latter is mounted on the casing 14. A conductor lead 29 electrically connects the contact leaf 24 with one end of the lamp 27. The other end of the lamp 27 is connected by a conductor 30 to a metallic strip 31 which extends longitudinally along the inner wall of the casing 14 and so electrically connects with the body contact of the cell 15. The adjacent ends of the casing sections 14 and 19 are adapted to be fused together after the conductor 29 has been positioned therebetween.

The operation of the device is as follows:

The strap 10 is secured to one's hand as illustrated in Figs. 1 and 2. Then the handles 21 and 26 are adjusted until the device operates satisfactorily in the following manner: When one is gripping the steering wheel in a convenient manner the ball 25 should naturally assume positions in which it does not simultaneously touch the contact leaves 20 and 24. When one's hand is extended through the window of a vehicle so that the lamp 27 is directed rearwards to signal following drivers, then the ball 25 engages the contacts 20 and 24 to close the electric circuit through the lamp.

The circuit may be traced from the end contact 15ª of the cell 15 to the end contact 18, the leaf 20, the conductor ball 25, the contact leaf 24, the conductor 29, the lamp 27 and the conductor 30 which engages the body contact of the cell 15 for completing the electrical circuit.

The leaf contacts 20 and 24 should be adjusted so that the vehicle operator may signal a right turn or a left turn, or intention to stop. The conventional signal for a right turn is to raise one hand vertically upwards through the open window. The leaf contacts 20 and 24 should be so adjusted that it is possible for the operator to place his hand in such a position that the circuit is closed in all positions from the horizontal to the vertical through an open window of the vehicle.

In Fig. 10, a battery cell 15' is illustrated with an inclined surface 31 upon which a contact leaf 20' is mounted to the battery terminal 32. A complementary contact leaf 24' is connected to a conductor which connects this latter contact leaf to the ground. A screw cap 33 is removably attached on the threaded portion 34 of battery casing 14' so that access may be had to the battery leaves and to the ball connector 25 which is free to roll within the inclined passage 35. This battery may be turned so that the ball 25 may roll to a position in the passage 35 and connect the terminal leaf 20' with the terminal leaf 24' or by turning the battery to a different position, the ball is allowed to roll off the terminal leaves which will automatically disconnect the same.

While I have illustrated and described the preferred embodiments of my invention, it is to be understood that I do not limit myself to the precise constructions herein disclosed and the right is reserved to the use of this battery for any other purpose and to all changes and modifications coming within the scope of the invention as defined in the appended claims.

Having thus described my invention, what I claim as new, and desire to secure by United States Letters Patent is:

1. In a device of the class described, a member for engagement upon an object which may assume various positions, a casing of insulation material mounted on said member, a hollow insulation body axially mounted on said casing, a turnably mounted end contact member extended through the inner end of said body, a contact leaf located within said body and fixedly mounted on the end of said end contact member to move therewith when said end contact member is turned, a turnably mounted spindle extended through the other end of said body, a second contact leaf located within said body and fixedly mounted on the inner end of said spindle to move therewith when said spindle is turned, a ball connector freely engaged in said body and engageable between said contact leaves, and means for turning said spindle and said end contact member to adjust the position of said contact leaves to one in which said ball connector will be engaged between said contact leaves in a predetermined position of said object which may assume various positions.

2. In a device of the class described, a member for engagement upon an object which may assume various positions, a casing of insulation material mounted on said member, a hollow insulation body axially mounted on said casing, a turnably mounted end contact member extended through the inner end of said body, a contact leaf located within said body and fixedly mounted on the end of said end contact member to move therewith when said end contact member is turned, a turnably mounted spindle extended through the other end of said body, a second contact leaf located within said body and fixedly mounted on the inner end of said spindle to move therewith when said spindle is turned, a ball connector freely engaged in said body and engageable between said contact leaves, and means for turning said spindle and said end contact member to adjust the position of said contact leaves to one in which said ball connector will be engaged between said contact leaves in a predetermined position of said object which may assume various positions, said means for turning said end contact member, comprising a handle having its inner end attached to an intermediate portion of said end contact member and the other of its ends extended through a passage formed in said body to the exterior thereof to be manually grasped and urged in one direction or the other to turn said end contact member and adjust the position of the contact leaf mounted thereon.

3. In a device of the class described, a member for engagement upon an object which may assume various positions, a casing of insulation material mounted on said member, a hollow insulation body axially mounted on said casing, a turnably mounted end contact member extended through the inner end of said body, a contact leaf located within said body and fixedly mounted on the end of said end contact member to move therewith when said end contact member is turned, a turnably mounted spindle extended through the other end of said body, a second contact leaf located within said body and fixedly mounted on the inner end of said spindle to move therewith when said spindle is turned, a ball connector freely engaged in said body and engageable between said contact leaves, and means for turning said spindle and said end contact member to adjust the position of said contact leaves to one in which said ball connector will be engaged between said contact leaves in a predetermined position of said object which may assume various positions, said means for turning said spindle, comprising a handle fixedly mounted on the outer end of said spindle to be manually grasped and urged in one direction or the other to turn said spindle and adjust the position of the contact leaf mounted thereon.

ABRAHAM I. LEVENTHAL.